United States Patent
Chow et al.

(10) Patent No.: US 9,852,636 B2
(45) Date of Patent: Dec. 26, 2017

(54) TRAFFIC EVENT DATA SOURCE IDENTIFICATION, DATA COLLECTION AND DATA STORAGE

(75) Inventors: Stephen Y. Chow, Dallas, TX (US); Grant D. Miller, Superior, CO (US); Nader M. Nassar, Yorktown Heights, NY (US); Richard J. Newhook, West Chester, PA (US); Erich D. Walls, Valparaiso, IN (US)

(73) Assignee: International Business Machines Corproation, Armonk, NY (US)

( * ) Notice: Subject to any disclaimer, the term of this patent is extended or adjusted under 35 U.S.C. 154(b) by 671 days.

(21) Appl. No.: 13/474,818

(22) Filed: May 18, 2012

(65) Prior Publication Data

US 2013/0311641 A1    Nov. 21, 2013

(51) Int. Cl.
*G06F 15/173*    (2006.01)
*G08G 1/00*    (2006.01)
(Continued)

(52) U.S. Cl.
CPC ............... *G08G 1/20* (2013.01); *G07C 5/085* (2013.01); *G08G 1/04* (2013.01); *H04W 4/046* (2013.01); *H04W 4/06* (2013.01); *G07C 5/008* (2013.01)

(58) Field of Classification Search
CPC ............ G08G 1/01; G06T 2207/10016; G06T 2207/30232; G06K 9/00771; H04W 8/005;
(Continued)

(56) References Cited

U.S. PATENT DOCUMENTS 4,701,797 A * 10/1987 Ferreira ..................... 348/724
4,847,860 A *  7/1989 Robert ........................ 375/136
(Continued)

FOREIGN PATENT DOCUMENTS

CN    2496721    6/2002
CN    1570980    1/2005
(Continued)

OTHER PUBLICATIONS

Integrated Transport Information System; May 7, 2012, 3 pages (Supplied by Applicant as prior art in IDS dated May 18, 2012).*
(Continued)

*Primary Examiner* — Richard G Keehn
(74) *Attorney, Agent, or Firm* — Gibb & Riley, LLC

(57) ABSTRACT

Traffic event data source identification embodiments comprise a first monitoring system that detects a traffic event, a communication device that broadcasts a discovery signal and receives back response signals from any second monitoring systems within the vicinity of the traffic event, and a memory that stores a list of responding second monitoring systems. Traffic event data collection embodiments incorporate the identification embodiments and additional features. In this case, the first monitoring system captures data recorded at the time of the traffic event and a second communication device transmits this data and, optionally, the list to a traffic event database in a traffic event data storage system. The first communication device also transmits a data capture request signal to the second monitoring system(s) requesting capture of any data recorded at the time of the traffic event and, optionally, requesting that such data be transmitted to the database.

24 Claims, 8 Drawing Sheets

(51) Int. Cl.
*G08G 1/04* (2006.01)
*G07C 5/08* (2006.01)
*H04W 4/04* (2009.01)
*H04W 4/06* (2009.01)
*G07C 5/00* (2006.01)

(58) Field of Classification Search
CPC ....... H04W 84/18; H04W 4/021; H04W 4/22; H04W 48/16; H04N 7/181
USPC .......................................................... 709/224
See application file for complete search history.

(56) References Cited

U.S. PATENT DOCUMENTS

| | | | |
|---|---|---|---|
| 6,271,752 B1* | 8/2001 | Vaios ............................ | 340/541 |
| 6,826,514 B1 | 11/2004 | Antico et al. | |
| 7,655,895 B2 | 2/2010 | Breed | |
| 7,853,563 B2 | 12/2010 | Alvarado et al. | |
| 8,121,753 B2 | 2/2012 | Bauchot et al. | |
| 8,487,762 B1* | 7/2013 | McMullen et al. ........... | 340/541 |
| 8,531,521 B2* | 9/2013 | Romanowich ................ | 348/143 |
| 8,630,727 B2* | 1/2014 | Estes ............................... | 700/94 |
| 2003/0126617 A1* | 7/2003 | Tewari et al. ................. | 725/119 |
| 2004/0143602 A1* | 7/2004 | Ruiz et al. ................. | 707/104.1 |
| 2004/0163118 A1* | 8/2004 | Mottur ......................... | 725/105 |
| 2005/0156734 A1 | 7/2005 | Zerwekh et al. | |
| 2005/0206726 A1* | 9/2005 | Yoshida et al. ............... | 348/143 |
| 2005/0278082 A1 | 12/2005 | Weekes | |
| 2006/0028556 A1* | 2/2006 | Bunn et al. .............. | 348/211.99 |
| 2006/0255931 A1* | 11/2006 | Hartsfield et al. ....... | 340/538.11 |
| 2007/0055482 A1 | 3/2007 | Goodermote et al. | |
| 2007/0102527 A1* | 5/2007 | Eubank et al. ............... | 235/492 |
| 2008/0042825 A1 | 2/2008 | Denny et al. | |
| 2008/0071465 A1 | 3/2008 | Chapman et al. | |
| 2008/0094171 A1* | 4/2008 | Sawhney ....................... | 340/5.6 |
| 2008/0094250 A1* | 4/2008 | Myr .............................. | 340/909 |
| 2008/0123558 A1* | 5/2008 | Chhabra ....................... | 370/254 |
| 2008/0140303 A1 | 6/2008 | Hiruta et al. | |
| 2008/0195261 A1* | 8/2008 | Breed ............................ | 701/2 |
| 2008/0252485 A1* | 10/2008 | Lagassey ....................... | 340/907 |
| 2009/0259349 A1* | 10/2009 | Golenski ....................... | 701/2 |
| 2009/0309709 A1 | 12/2009 | Bevacqua et al. | |
| 2010/0054154 A1* | 3/2010 | Lambert et al. .............. | 370/254 |
| 2010/0106797 A1* | 4/2010 | Nagaraja ....................... | 709/217 |
| 2010/0217478 A1 | 8/2010 | Zhang et al. | |
| 2010/0222939 A1* | 9/2010 | Namburu et al. ................ | 701/2 |
| 2010/0299020 A1 | 11/2010 | Koepf et al. | |
| 2010/0317391 A1* | 12/2010 | Mody et al. .................. | 455/512 |
| 2011/0016030 A1 | 1/2011 | Goodermote et al. | |
| 2011/0038268 A1* | 2/2011 | Ross et al. .................... | 370/252 |
| 2011/0087505 A1* | 4/2011 | Terlep .............................. | 705/4 |
| 2011/0151725 A1* | 6/2011 | Fadell et al. .................. | 439/660 |
| 2011/0273568 A1* | 11/2011 | Lagassey ....................... | 348/159 |
| 2012/0026308 A1* | 2/2012 | Johnson et al. ................ | 348/77 |
| 2012/0155483 A1* | 6/2012 | Pugliese, IV ................. | 370/401 |
| 2012/0188370 A1* | 7/2012 | Bordonaro .................... | 348/143 |
| 2012/0200431 A1* | 8/2012 | Ross ............................. | 340/936 |
| 2013/0006469 A1* | 1/2013 | Green et al. .................... | 701/36 |
| 2013/0124508 A1* | 5/2013 | Paris et al. .................... | 707/723 |
| 2013/0165154 A1* | 6/2013 | Joshi .......................... | 455/456.3 |

FOREIGN PATENT DOCUMENTS

| | | |
|---|---|---|
| CN | 101127660 | 2/2008 |
| DE | 196 04 084 A1 | 10/1996 |
| JP | 09-311991 | 2/1997 |

OTHER PUBLICATIONS

De Fuentes, et al., "Full paper: Witness-based evidence generation in Vehicular Ad-Hoc Networks," Embedded Security in Cars Conference (ESCAR) 2009, p. 1-9.

Lee, et al., "MobEyes: Smart Mobs for Urban Monitoring with a Vehicular Sensor Network," 2006, p. 1-6.

White, et al., "WreckWatch: Automatic Traffic Accident Detection and Notification with Smartphones," Journal of Mobile Networks and Applications Manuscript No., 2012, p. 1-28.

Integrated Transport Information System, ITIS, Fact Sheet, May 7, 2012, 3 pages.

Lee, et al., "Emerging Vehicular Application," UCLA, Chapter 1, 2009, p. 1-30.

Lee, et al., "Data Collection Scheme for Two-Tier Vehicular Sensor Network," G. Pandurangan, et al. (Eds.): WASA 2010, LNCA 6221, 2010, ABS Only.

Application No. 201310187428.7, CN Office Action dated Feb. 2, 2016, pp. 1-11.

Application No. 201310187428.7, English translation of CN Office Action dated Feb. 2, 2016, pp. 1-16.

* cited by examiner

TRAFFIC EVENT DATA SOURCE IDENTIFICATION, DATA COLLECTION AND DATA STORAGE

BACKGROUND

Field of the Invention

The embodiments disclosed herein relate to traffic event investigations and, more particularly, to systems and associated methods for traffic event data source identification, traffic event data collection and traffic event data storage.

Description of the Related Art

Investigators from various different governmental and private organizations (e.g., local and/or state police departments, insurance companies, automobile manufacturers, the National Highway Traffic Safety Administration (NHTSA), etc.) often investigate the circumstances surrounding a traffic event (i.e., a traffic accident or other traffic-related incident) to determine cause, fault, aggravating factors, mitigating factors, etc. Typically, investigators from the different organizations independently collect the information necessary to make such determinations by manually identifying and tracking down specific data sources and then acquiring data from each of those data sources. Unfortunately, collecting the information in this manner can be time consuming. Additionally, some data sources may go unidentified and/or by the time they are identified the data may no longer be available (e.g., may be deleted). Therefore, there is a need in the art for systems and associated methods, which provide for automatically identifying data sources with data about a traffic event, for collecting the data from those data sources in a timely manner, and for storing the collected data in a central location.

SUMMARY

In view of the foregoing disclosed herein are embodiments of systems and associated methods for traffic event data source identification, traffic event data collection and traffic event data storage. The traffic event data source identification embodiments can comprise a first monitoring system that detects a traffic event, an inter-monitoring system communication device that broadcasts a monitoring system discover signal and receives back response signals from any second monitoring systems within the vicinity of the traffic event, and a memory that stores a list of responding second monitoring systems. The traffic event data collection embodiments can incorporate the identification system and a network interface device. In this case, the first monitoring system can capture data recorded at the time of the traffic event and the network interface device can transmit this data and, optionally, the list to a traffic event data storage system for storage in a traffic event database. The inter-monitoring system communication device can also transmit a data capture request signal to the second monitoring system(s) requesting capture of any data recorded at the time of the traffic event and, optionally, requesting that such data be transmitted to the data storage system. To address privacy concerns, access to the traffic event database can be controlled based on a predetermined access authorization policy. Thus, these embodiments provide for automatically identifying data sources with data about a traffic event, for collecting the data from those data sources in a timely manner, and for securely storing the collected data in a central location.

More particularly, disclosed herein are embodiments of a traffic event data source identification system, a traffic event data collection system and a traffic event data storage system.

The traffic event data source identification system can comprise a first monitoring system, an inter-monitoring system communication device and a local memory. The first monitoring system can detect a traffic event. In response to the traffic event, the inter-monitoring system communication device can locally broadcast a monitoring system discovery signal from the location of the traffic event. Additionally, the inter-monitoring system communication device can receive response signals transmitted back in response to the discovery signal from any second monitoring systems that are located within the vicinity of the traffic event or, more specifically, that were located within the vicinity of the traffic event around the time the traffic event occurred and the discovery signal was broadcast. The local memory can store a list of all second monitoring systems responding to the discovery signal. Thus, this traffic event data source identification system provides for timely identification of traffic event data sources and, particularly, timely identification of monitoring systems that were present in the vicinity of a traffic event at the time it occurred and that may have recorded data regarding that traffic event.

The traffic event data collection system can incorporate the traffic event data source identification system and a network interface device. Specifically, the traffic event data collection system can comprise a traffic event data source identification system, which as discussed above, comprises a first monitoring system, an inter-monitoring system communication device and a local memory. In this traffic event data collection system, the first monitoring system can, upon detection of the traffic event, further capture any first data it recorded around the time of the traffic event (e.g., within a predetermined time window during which the traffic event occurred). The captured first data can be stored in the local memory along with the list of second monitoring system(s) responding to the monitoring system discover signal. Additionally, the traffic event data collection system can comprise a network interface device. This network interface device can be used to transmit the first data to a traffic event data storage system for storage. Optionally, the network interface device can also be used to transmit the list of second monitoring system(s) to the traffic event data storage system for storage along with the first data. Additionally, the inter-monitoring system communication device can transmit a data capture request signal to each second monitoring system on the list, requesting that the second monitoring system capture any second data it recorded within the same predetermined time window. Optionally, this data capture request signal can further include a request that the second data be transmitted to the traffic event data storage system for storage along with the first data.

The traffic event data storage system can store, in a central traffic event database, the data collected using the above-described traffic event data collection system. Specifically, this traffic event data storage system can comprise a memory, a traffic event database stored in the memory, and a traffic event database server, which maintains the traffic event database. Additionally, this traffic event data storage system can comprise a network interface device, which allows for communication over a communication network (e.g., the Internet) between the traffic event database server and a plurality of monitoring systems. The network interface device can receive the first data captured by the first monitoring system upon detection of the traffic event. It can further receive the list of all second monitoring systems that responded to the monitoring system discovery signal locally broadcast by the first monitoring system from the location of the traffic event and/or the second data captured by at least one second monitoring system in response to a data capture request signal from the first monitoring system. Once received, the traffic event database server can input the first data as well as the list and/or second data into the traffic event database such that they are associated with a unique identifier for the traffic event. To address privacy concerns, the traffic event database server can further control access to all data stored in the traffic event database, based on a predetermined access authorization policy.

Also disclosed herein are embodiments of a traffic event data source identification method, a traffic event data collection method and a traffic event data storage method.

The traffic event data source identification method can comprise detecting (e.g., by a first monitoring system) a traffic event. This traffic event data source identification method can further comprise locally broadcasting (e.g., by an inter-monitoring system communication device) a monitoring system discovery signal from the location of the traffic event and receiving back response signals from any second monitoring systems that are located within the vicinity of the traffic event or, more specifically, that were located within the vicinity of the traffic event around the time the traffic event occurred and the discovery signal was broadcast. Next, the traffic event data source identification method can comprise storing, in a local memory, a list of all second monitoring systems responding to the monitoring system discover signal. Thus, this traffic event data source identification method provides for timely identification of traffic event data sources and, particularly, timely identification of other monitoring systems that were present in the vicinity of a traffic event at the time it occurred and that may have recorded data regarding that traffic event.

The traffic event data collection method can incorporate the traffic event data source identification method and several additional process steps. Specifically, the traffic event data collection method can comprise performing the above-discussed traffic event data source identification method. Additionally, the traffic event data collection method can comprise, upon detection of the traffic event, capturing (e.g., by the first monitoring system) any first data it records around the time of the traffic event (e.g., within a predetermined time window during which the traffic event occurred) and storing that first data in the local memory along with the list of second monitoring system(s) responding to the monitoring system discover signal. Furthermore, this traffic event data collection method can comprise transmitting (e.g., via a network interface device) the first data and, optionally, the list of second monitoring systems, to a traffic event data storage system for storage in a traffic event database. Additionally, the traffic event data collection method can comprise transmitting (e.g., by the inter-monitoring system communication device) a data capture request signal to each second monitoring system on the list, requesting that the second monitoring system capture any second data it recorded within the same predetermined time window. Optionally, this data capture request signal can further include a request that the second data be transmitted to the traffic event data storage system for storage in the traffic event database along with the first data.

The traffic event data storage method can comprise storing, in a traffic event database, the data collected using the above-described traffic event data collection system. Specifically, this traffic event data storage method can comprise receiving (e.g., by a network interface device that allows for communication between a traffic event database server and a plurality of monitoring systems) any first data captured by the first monitoring system upon detection of a traffic event. The traffic event data storage method can further comprise receiving (e.g., by the network interface device) the list of all second monitoring systems that responded to the monitoring system discovery signal locally broadcast by the first monitoring system and/or any second data captured by the second monitoring system(s) in response to the data capture request signal from the first monitoring system. This traffic event database storage method can further comprise inputting (e.g., by the traffic event database server) the first data and the list and/or second data in the traffic event database and associating the first data and the list and/or second data in the traffic event database with a unique identifier for the traffic event. To address privacy concerns, the traffic event data storage method can further comprising controlling (e.g., by the traffic event database server) access to all data stored in the traffic event database, based on a predetermined access authorization policy.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, investigators from various different governmental and private organizations (e.g., local and/or state police departments, insurance companies, automobile manufacturers, the National Highway Traffic Safety Administration (NHTSA), etc.) often investigate the circumstances surrounding a traffic event (i.e., a traffic accident and other traffic-related incident) to determine cause, fault, aggravating factors, mitigating factors, etc. Typically, investigators from the different organizations independently collect the information necessary to make such determinations by manually identifying and tracking down specific data sources and then acquiring data from each of those data sources. Unfortunately, collecting the information in this manner can be time consuming. Additionally, some data sources may go unidentified and/or by the time they are identified the data may by no longer be available (e.g., may be deleted).

Figure 1:
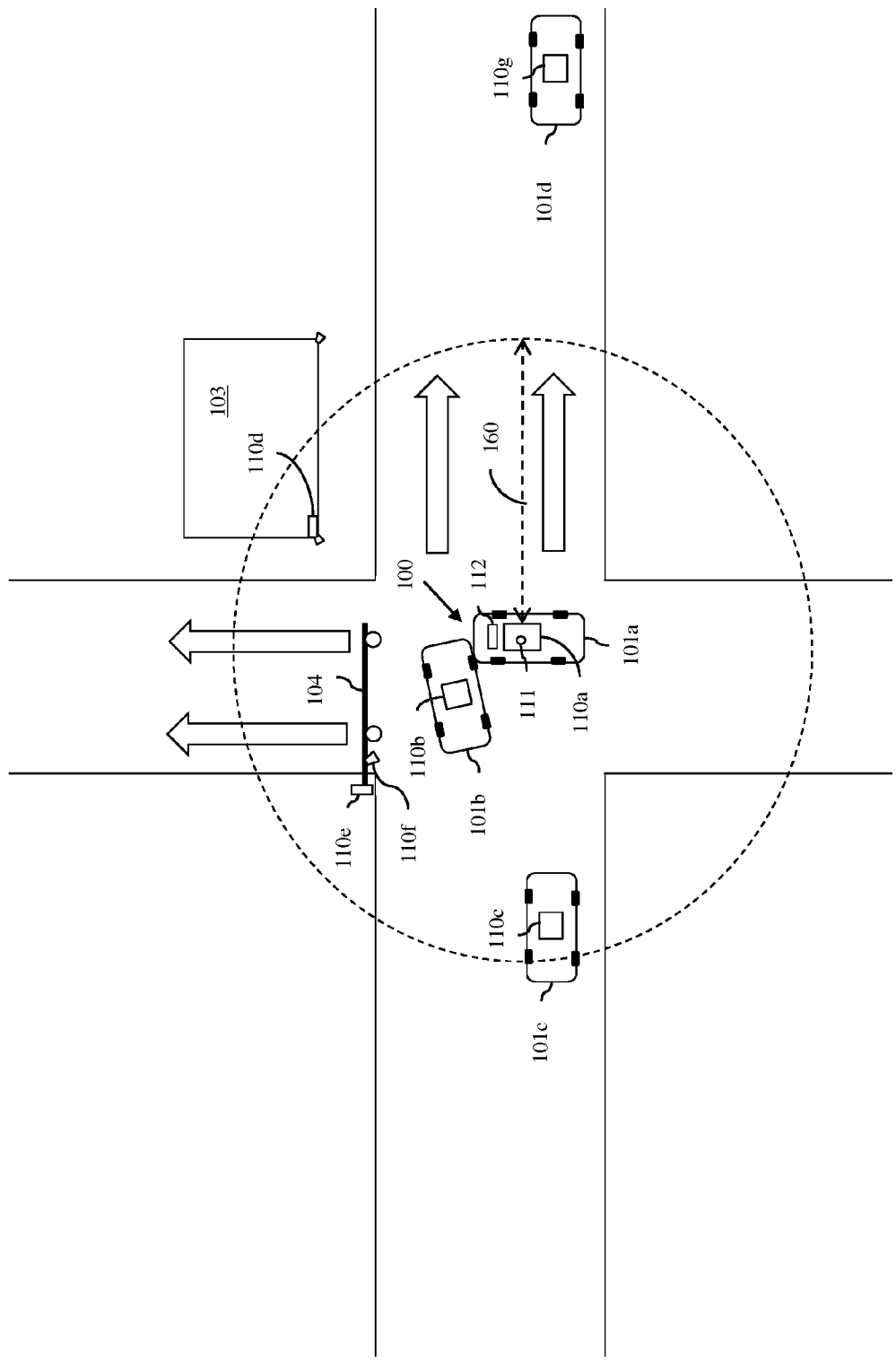
FIG. 1 is a top view diagram illustrating an exemplary traffic event.

More particularly, FIG. 1 is a top view diagram illustrating an exemplary traffic event 100. For purposes of this disclosure, a "traffic event" refers to a traffic accident or other traffic-related incident involving one or more automotive vehicles. Additionally, for purposes of this disclosure, an "automotive vehicle" refers to any self-propelled wheeled vehicle including, but not limited to, a car, a motorcycle, a truck, a semi-truck, a sports utility vehicle, a van, a tractor, etc.

The exemplary traffic event 100 shown in FIG. 1 is a traffic accident involving two automotive vehicles 101a and 101b. When such a traffic event 100 occurs oftentimes there are various monitoring systems (see monitoring systems 110a-f), which are located within the vicinity of the traffic event 100 (e.g., within a predetermined distance 160 of the traffic event) and which may have recorded data around the time of the traffic event (e.g., within a predetermined time window that includes the time of the traffic event).

These monitoring systems can comprise, for example, the on-board vehicle monitoring systems 110a and 110b of the vehicles 101a and 101b, respectively, involved in the traffic event 100 or the on-board vehicle monitoring system 110c of a vehicle 101c close by, but not involved in the traffic event 100. For purposes of this disclosure, an "on-board vehicle monitoring system" refers to any system or combination of systems, which are located on-board an automotive vehicle and which provide for driver and/or vehicle monitoring.

For example, an on-board vehicle monitoring system can comprise any of the following systems alone and/or in combination: a vehicle status monitoring system (also referred to in the art as an on-board diagnostic system, which monitors the vehicle's electrical and mechanical systems); a driver behavior monitoring system (also referred to in the art as an onboard safety monitoring system, which continuously measures safety-related driving parameters, such as speed, acceleration and braking force, and/or which takes video or photographic images of the driver operating the automotive vehicle); a global positioning system (GPS) location monitoring system (also referred to in the art as a vehicle tracking system, which continuously, periodically or on-demand tracks an automotive vehicle's location using an on-board GPS); and/or an event data recorder (also referred to in the art as a "black box", which when triggered by the detection of a traffic event records operational information, such as speed, crash severity, buckle status, brake application, steering inputs, etc.).

Such on-board vehicle monitoring systems are well known in the art and, thus, the details are omitted from this specification in order to allow the reader to focus on the salient aspects of the embodiments. However, those skilled in the art will recognize that such on-board vehicle monitoring systems typically include sensors and/or other devices (e.g., cameras), which provide inputs over an electronic bus to the micro-processor(s) of an on-board computer network. Data recorded by an on-board vehicle monitoring system and stored in a local memory can be downloaded directly to an external device, for example, by physically connecting the external device to an input/output port located on-board the automotive vehicle. Alternatively, such data can be uploaded to another system for analysis and/or storage via a wireless network interface device (e.g., a cellular-based device, a satellite-based device, etc.)

These monitoring systems can also comprise, for example, monitoring systems located on or near a traffic signal 104 or other structure 103 within the vicinity of the traffic event 100. For example, a traffic signal status monitoring system 110e (also referred to in the art as a traffic light monitoring system) can be located on or near a traffic signal 104 within the vicinity of the traffic event 100. Traffic signal monitoring systems typically track the state of a traffic signal at any given time, including the color of the traffic light and whether or not it is solid or flashing. A traffic enforcement monitoring system 110f (also referred to in the art as a traffic camera system) can similarly be located on or near the traffic signal 104. Traffic enforcement monitoring systems typically take photographic images of traffic intersections periodically or upon the detection of a traffic violation (e.g., a vehicle running a red light). These monitoring systems can also comprise a security surveillance monitoring system 110d located, for example, on a building or other structure 103 within the vicinity of the traffic event 100. Security surveillance monitoring systems typically take photographic or video images continuously, periodically, or upon-detection of a triggering event (e.g., such systems can be motion or sound activated).

Traffic signal monitoring systems, traffic enforcement monitoring systems and security surveillance monitoring systems are well known in the art and, thus, the details of such systems are omitted from this specification in order to allow the reader to focus on the salient aspects of the embodiments. However, those skilled in the art will recognize that such monitoring systems typically include sensors and/or other devices (e.g., cameras), which provide inputs over an electronic bus to the micro-processor(s) of a computer network. Data recorded by such monitoring systems and stored in a local memory can be downloaded directly to an external device, for example, by physically connecting the external device to an input/output port. Alternatively, such data can be uploaded to another system for analysis and/or storage via a wireless network interface device (e.g., a cellular-based device, a satellite-based device, etc.) or a wired network interface device (e.g., a wired Internet connection).

In any case, given the types of data recorded by these monitoring systems 110a-f, they may be useful data sources for investigators (e.g., local and/or state police investigators, insurance investigators, automobile manufacturer investigators, National Highway Traffic Safety Administration (NHTSA) investigators, etc.) trying to determine the cause, fault, aggravating factors, mitigating factors, etc. of the traffic event 100. However, identifying all the different monitoring systems within the vicinity of the traffic event 100 at the time the event occurred and collecting the data in a timely manner so that it isn't overwritten or destroyed can be difficult.

In view of the foregoing disclosed herein are embodiments of systems and associated methods for traffic event data source identification, traffic event data collection and traffic event data storage. The traffic event data source identification embodiments can comprise a first monitoring system that detects a traffic event, an inter-monitoring system communication device that broadcasts a monitoring system discover signal and receives back response signals from any second monitoring systems within the vicinity of the traffic event, and a memory that stores a list of responding second monitoring systems. The traffic event data collection embodiments can incorporate the identification system and a network interface device. In this case, the first monitoring system can capture data recorded at the time of the traffic event and the network interface device can transmit this data and, optionally, the list to a traffic event data storage system for storage in a traffic event database. The inter-monitoring system communication device can also transmit a data capture request signal to the second monitoring system(s) requesting capture of any data recorded at the time of the traffic event and, optionally, requesting that such data be transmitted to the data storage system. To address privacy concerns, access to the traffic event database can be controlled based on a predetermined access authorization policy. Thus, these embodiments provide for automatically identifying data sources with data about a traffic event, for collecting the data from those data sources in a timely manner, and for securely storing the collected data in a central location.

Figure 2:
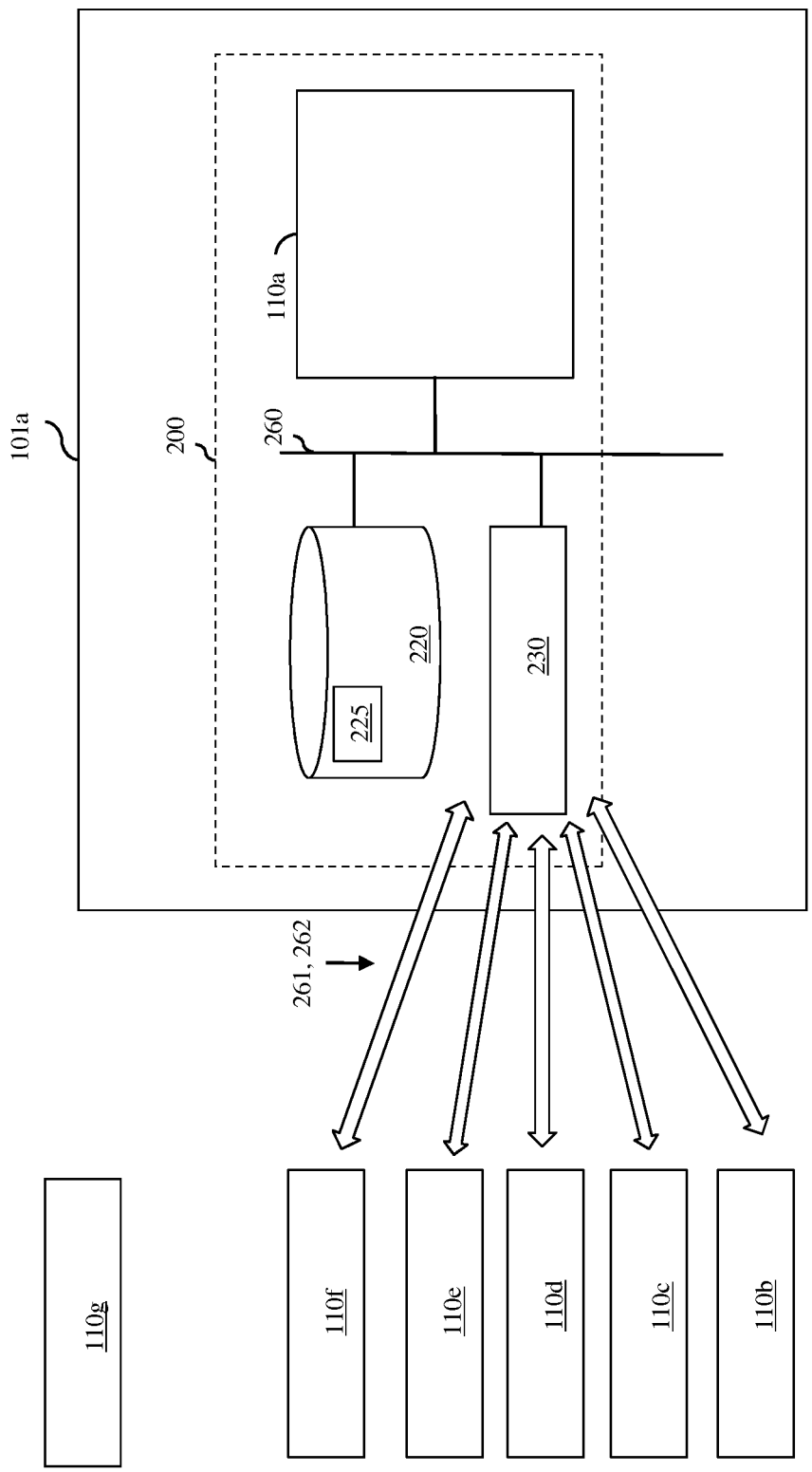
FIG. 2 is a schematic diagram illustrating an embodiment of a traffic event data source identification system.

Specifically, referring to FIG. 2 in combination with FIG. 1, disclosed herein are embodiments of a traffic event data source identification system 200. The traffic event data source identification system 200 can comprise a first monitoring system (see discussion below), an inter-monitoring system communication device 230 and a local memory 220.

For illustration purposes, the traffic event data source identification system 200 is shown in FIG. 2 as being incorporated into one of the vehicles involved in the traffic event (see vehicle 101a) and the first monitoring system comprises the on-board vehicle monitoring system 110a of that vehicle 101a. However, it should be understood that, alternatively, this traffic event data source identification system can alternatively be located elsewhere (e.g., on a traffic signal 104 or other structure 103) and can incorporate one of the other types of monitoring systems (e.g., a traffic signal status monitoring system 110e, a traffic enforcement monitoring system 110f, a security surveillance monitoring system 110d, etc.) within the vicinity of the traffic event 100.

This first monitoring system 110a can detect (i.e., can be adapted to detect, can be configured to detect, can be programmed to detect, etc.) the occurrence of the traffic event 100. For example, the first monitoring system 110a can comprise an airbag deployment sensor 111 that senses (i.e., is adapted to sense, is configured to sense, etc.) the deployment of an airbag 112 within the vehicle 101a and deployment of the airbag 112 can be indicative of the occurrence of the traffic event involving the vehicle 101a. Alternatively, this first monitoring system 110a can comprise any other on-board component capable of detecting the occurrence of a traffic event (e.g., a brake pedal sensor sensing the force applied by the driver to the brake pedal, where an amount of force above a predetermined threshold is indicative of the occurrence of a traffic event; and so on).

It should be understood that, when the first monitoring system is not an on-board vehicle monitoring system, other suitable means can be used by that monitoring system to detect a traffic event. For example, for a traffic signal status monitoring system, data from pressure plates embedded within the intersection may indicate that traffic flow through the intersection has stopped, thereby indicating that a traffic event has occurred; for a traffic enforcement monitoring system and/or a security surveillance monitoring system, results of image analysis or other processes may indicate that a traffic event has occurred; and so on.

The inter-monitoring system communication device 230 can be connected to and in communication with the first monitoring system 110a, for example, over an electronic bus 260 and, in response to the traffic event 100, can locally broadcast (i.e., can be adapted to locally broadcast, can be configured to locally broadcast, can be programmed to locally broadcast, etc.) a monitoring system discovery signal 261 from the location of the traffic event 100. The inter-monitoring system communication device 230 can comprise any communication device capable of broadcasting the discovery signal 261 out to any second monitoring systems located within a predetermined distance 160 (e.g., 50 meters, 100 meters, etc.) of the traffic event 100 (e.g., see monitoring systems 110b-f, but not monitoring system 110g) and having the required inter-monitoring system communication devices to receive and respond to the monitoring system discover signal 261. This inter-monitoring system communication device 230 can, for example, comprise a radio frequency communication device, such as a radio frequency identification (RFID) device (e.g., an RFID transceiver), a near field communication (NFC) device, a Bluetooth®-enabled communication device, or any other communication device capable of such local signal broadcasting. The predetermined distance 160 within which the discovery signal is broadcast can be established based on the broadcast range of the technology used as well as on a balancing of factors (e.g., the increase in possible data sources with an increase in range and the decrease in useful data from data sources at the outer limits of the broadcast range).

Additionally, the inter-monitoring system communication device 230 can receive response signals 262 broadcast in response to the discovery signal 261. Specifically, the response signals 262 can be transmitted from any second monitoring systems (e.g., see monitoring systems 110b-f, but not monitoring system 110g) that are located within the vicinity of the traffic event 100 or, more specifically, that were located within the vicinity of the traffic event 100 around the time the traffic event occurred and the discovery signal was broadcast. As mentioned above, each of these second monitoring systems 110b-f is equipped with the appropriate inter-monitoring system communication device (e.g., a radio frequency communication device, such as a radio frequency identification (RFID) device, a near field communication (NFC) device, a Bluetooth®-enabled communication device, etc.) in order to be able to receive and respond to communications from the traffic event data source identification system 200. To address privacy concerns, optionally, each of the second monitoring systems 110b-f can incorporate an activation switch (i.e., an on-off switch) operable by the user/owner to allow or disallow communication with other monitoring systems.

Each response signal 262 transmitted from a second monitoring system to the inter-monitoring system communication device 230 can include identification information for that respective second monitoring system. As discussed above, these second monitoring system(s) 110b-f can comprise, for example, on-board vehicle monitoring systems of vehicles involved in or in the vicinity of the traffic event 100 at the time it occurred, traffic signal status monitoring systems on traffic signals within the vicinity of the traffic event 100, traffic enforcement monitoring systems within the vicinity of the traffic event 100, security surveillance monitoring systems within the vicinity of the traffic event 100, etc. Thus, for an on-board vehicle monitoring system (e.g., see on-board monitoring systems 110b and 110c of vehicles 101b and 101c, respectively), the identification information can comprise, for example, vehicle identification information (e.g., a vehicle identification number (VIN)) and/or vehicle owner identification information. For other types of monitoring systems (e.g., see traffic signal status monitoring system 110e, traffic enforcement monitoring system 110f and security surveillance monitoring system 110d), the identification information can comprise, for example, address information and/or owner identification information.

The local memory 220 (i.e., a local data storage device) can be connected to the first monitoring system 110a (e.g., by electronic bus 260) and can store a list 225 of all second monitoring systems 110b-f that responded to the monitoring system discover signal 261, including the identification information for those second monitoring systems. The list 225 can be associated in the local memory 220 with a unique identifier for the traffic event 100. This unique identifier can comprise, for example, a date, time, and location (e.g., as indicated by global positioning system (GPS) coordinates) of the traffic event 100. Access to the local memory 220 of the traffic event data source identification system 200 can be limited, for example, to the owner or manufacturer of the first monitoring system 110a, unless otherwise authorized by a court order, search warrant, and/or other applicable laws and regulations.

Thus, traffic event data source identification system 200 of FIG. 2 provides for timely identification of traffic event data sources and, particularly, timely identification of other monitoring systems 110b-f, which were present in the vicinity of a traffic event 100 at the time it occurred and which may have recorded data regarding that traffic event 100. It should be noted that, when a second monitoring system that responds to the monitoring system discover signal is an on-board vehicle monitoring system (e.g., see monitoring system 110c of vehicle 101c), the identification information provided may also lead to the identification of a witness to the traffic event that was not otherwise identified (e.g., the driver or passengers in the vehicle 101c).

Figure 3:
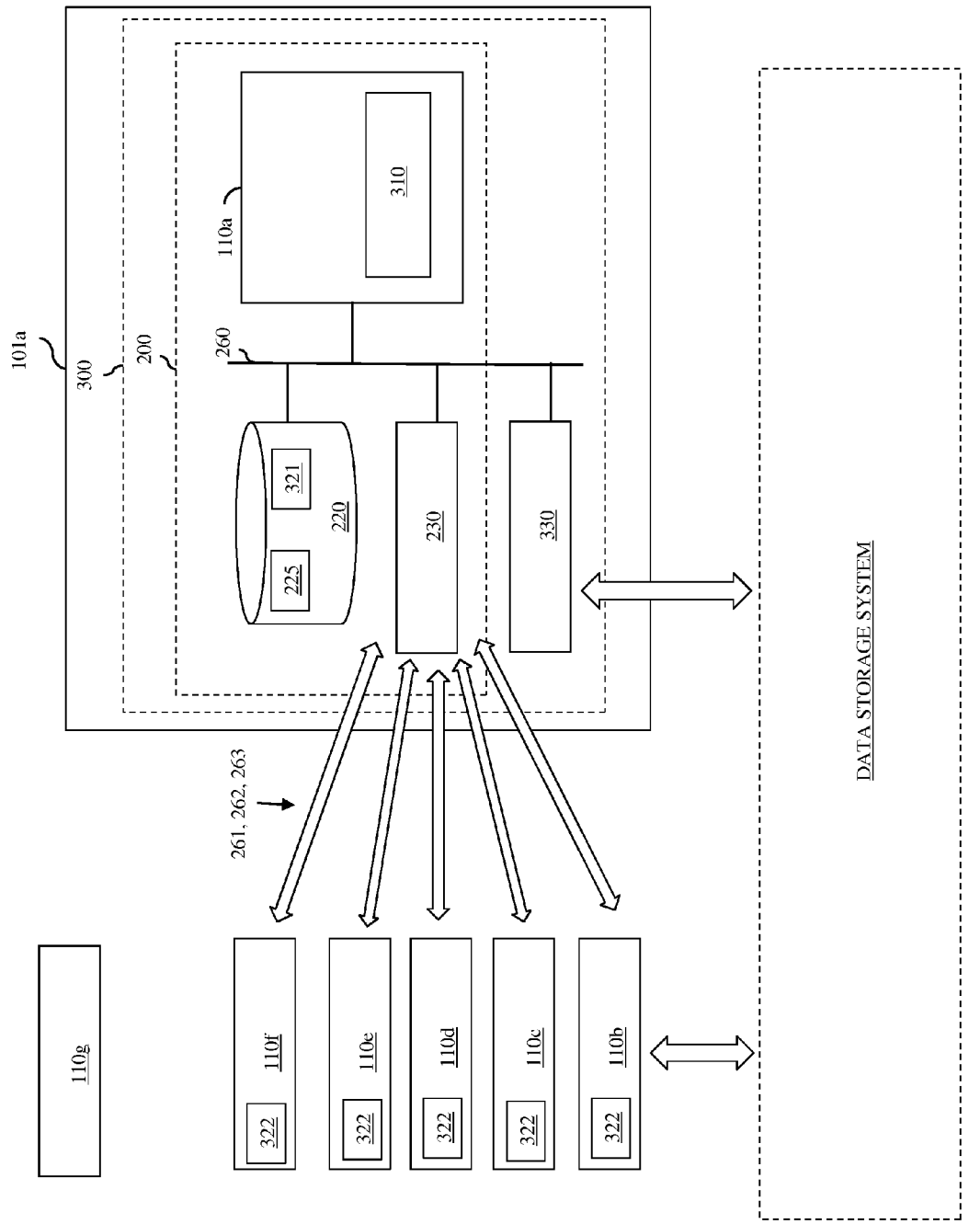
FIG. 3 is a schematic diagram illustrating an embodiment of a traffic event data collection system incorporating the traffic event data source identification system of FIG. 2.

Referring to FIG. 3 in combination with FIG. 1, also disclosed herein are embodiments of a traffic event data collection system 300. The traffic event data collection system 300 can incorporate the traffic event data source identification system 200, as described in detail above, as well as a network interface device 330.

Specifically, the traffic event data collection system 300 can comprise a traffic event data source identification system 200 comprising a first monitoring system 110a, an inter-monitoring system communication device 230 and a local memory 220, as described in detail above and connected, for example, via an electronic bus 260. In the traffic event data collection system 300, the first monitoring system 110a can further comprise an event data recorder 310 and this event data recorder 310 can, upon detection of the traffic event 100, capture (i.e., can be adapted to capture, can be configured to capture, can be programmed to capture, etc.) any first data 321 recorded by the first monitoring system 110a around the time of the traffic event (e.g., within a predetermined time window during which the traffic event 100 occurred).

For example, if, as illustrated, the first monitoring system 110a is an on-board vehicle monitoring system, the event data recorder can capture any recorded global positioning system (GPS) location information and any other recorded operational "black box" information, such as speed, crash severity, buckle status, brake application, steering inputs, video or photographic images, etc. The captured first data 321 can then be stored in the local memory 220 along with the list 225 of second monitoring system(s) responding to the monitoring system discover signal such that it is associated with the same unique identifier and such that it is not overwritten or deleted.

Additionally, the inter-monitoring system communication device 230 can transmit (i.e., can be adapted to transmit, can be configured to transmit, can be programmed to transmit, etc.) a data capture request signal 263 to each second monitoring system 110b-f on the list 225, requesting that the second monitoring systems 110b-f capture any second data 322 they recorded within the same predetermined time window. Specifically, the data capture request signal 263 can request that any second data 322 recorded within the predetermined time window be associated with the same unique identifier for the traffic event 100 and stored locally such that it is not overwritten or deleted. As mentioned above, this unique identifier can comprise, for example, a date, time, and location (e.g., as indicated by global positioning system (GPS) coordinates) of the traffic event 100.

It should be noted that, when the second monitoring system is another on-board vehicle monitoring system of another vehicle, the captured second data can be the recorded global positioning system (GPS) location information and other recorded operational "black box" information for that other vehicle. However, when the second monitoring system is a traffic signal status monitoring system, the second data can be traffic signal data; when the second monitoring system is a traffic enforcement monitoring system, the second data can be traffic camera data; when the second monitoring system is a security surveillance monitoring system, the second data can be video surveillance data; and so on.

The network interface device 330 can comprise, for example, a wireless network interface device, such as a cellular-based network interface device or a satellite-based network interface device. However, if the traffic event data collection system 300 is at a fixed location (e.g., not on-board an automotive vehicle) then the network interface device 330 could, alternatively, comprise a wired network interface device. It should be understood that this network interface device 330 can, for example, comprise the same network interface device used to upload monitoring system data for analysis and/or storage, as discussed above.

In any case, the network interface device 330 can transmit (i.e., can be adapted to transmit, can be configured to transmit, can be programmed to transmit, etc.) the first data 321 captured by the first monitoring device 110a to a traffic event data storage system for storage in a traffic event database, as discussed in greater detail below and illustrated in FIG. 4. As in the local memory 220, the first data 321 should be associated in the traffic event database with a unique identifier and this unique identifier can comprise, for example, a date, time, and location (e.g., as indicated by global positioning system (GPS) coordinates) of the traffic event 100.

Additionally, in one embodiment, the network interface device 330 can also transmit (i.e., can be adapted to transmit, can be configured to transmit, can be programmed to transmit, etc.) the list 225 of second monitoring system(s) 110b-f to the traffic event data storage system for storage in the traffic event database along with the first data 321. In another embodiment, the data capture request signal 263 transmitted by the inter-monitoring system communication device 230 to the second monitoring systems 110b-f can further include a request that the second data 322, which is captured by the second monitoring systems 110b-f, be transmitted to the traffic event data storage system for storage in the traffic event database along with the first data 321.

It should be noted that in order to address privacy concerns, in the traffic event data collection system 300 described above each of the monitoring systems can incorporate an activation switch (i.e., an on-off switch) operable by the user/owner to allow or disallow communication with other monitoring systems and/or with the traffic event data storage system 400.

Figure 4:
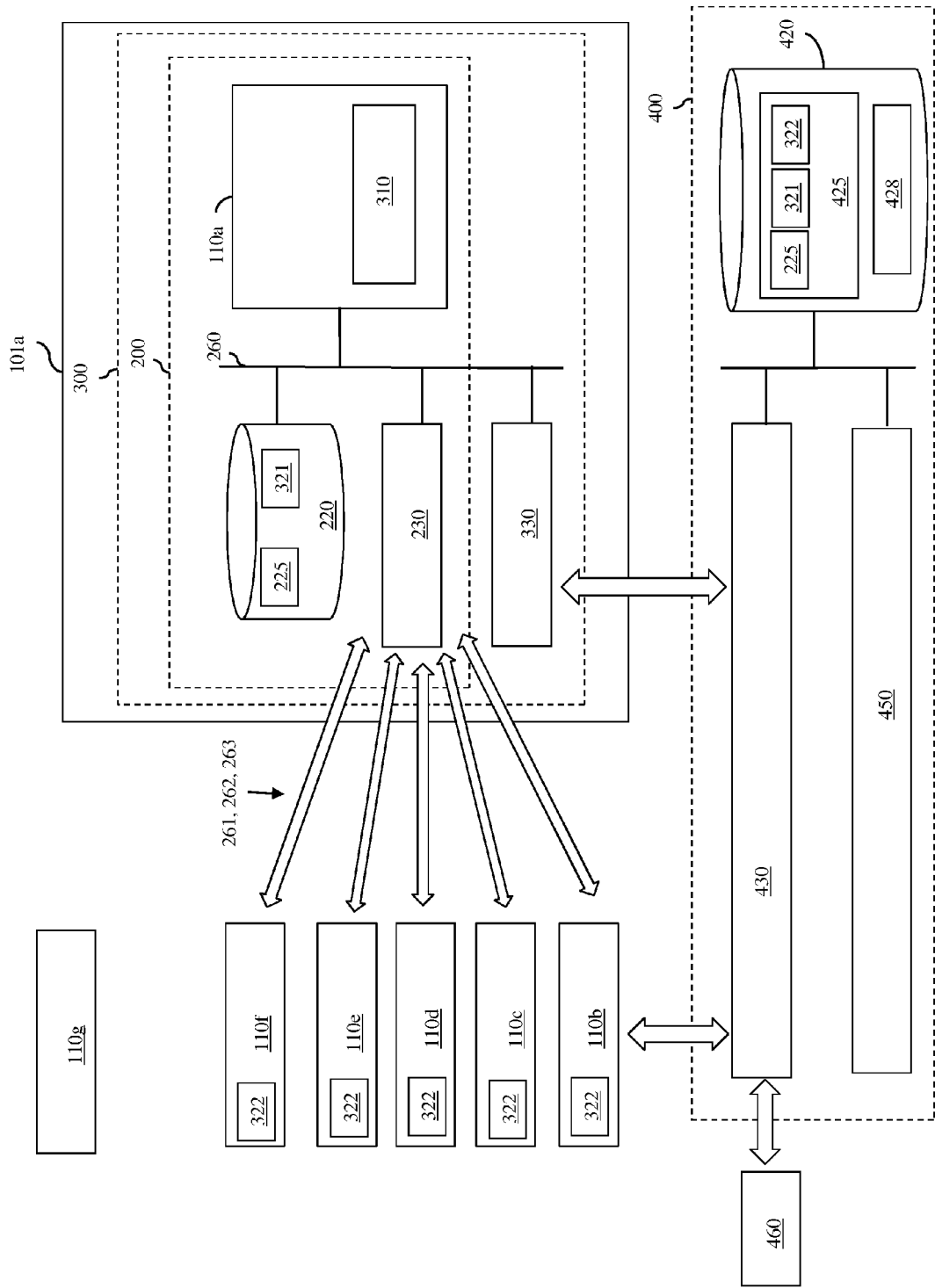
FIG. 4 is a schematic diagram illustrating an embodiment of a traffic event data storage system that stores data captured and collected using the traffic event data collection system of FIG. 3.

Referring to FIG. 4 in combination with FIG. 1, also disclosed herein are embodiments of a traffic event data storage system 400. The traffic event data storage system 400 can store the data captured and collected using the above-described traffic event data collection system 300.

Specifically, this traffic event data storage system 400 can comprise a memory 420, a traffic event database 425 stored in the memory 420, and a traffic event database server 450, which maintains the traffic event database 425. Additionally, this traffic event data storage system 400 can comprise a network interface device 430, which allows for communication between the traffic event database server 450 and a plurality of monitoring systems 110a-g. The network interface device 430 can comprise, for example, a wired network interface device or a wireless network interface device (e.g., a cellular-based network interface device or a satellite-based network interface device).

The network interface device 430 can receive (i.e., can be adapted to receive, configured to receive, etc.) the first data 321, discussed in detail above, which was captured by the first monitoring system 110a and transmitted to the traffic event data storage system 400 upon detection, by the first monitoring system 110a, of the traffic event 100. The network interface device 430 can further receive the list 225 of all second monitoring systems 110b-f, which responded to the monitoring system discovery signal 261 broadcast by the first monitoring system 110a from the location of the traffic event 100, and/or any second data 322 captured by the second monitoring system(s) 110b-f in response to the data capture request signal from the first monitoring system 110a.

The traffic event database server 450 can input (i.e., can be adapted to input, can be configured to input, can be programmed to input, etc.) the first data 321 as well as the list 225 and/or the second data 322 into the traffic event database 425 such that they are associated with a unique identifier for the traffic event 100. As discussed above, this unique identifier can comprise, for example, a date, time, and location (e.g., as indicated by global positioning system (GPS) coordinates) of the traffic event 100.

Additionally, to address privacy concerns, the traffic event database server 450 can further control access to all data stored in the traffic event database 425, based on a predetermined access authorization policy 428. For example, the predetermined access authorization policy 428 can allow access by investigators or other users 460, as specified by the owners of the respective monitoring systems, unless otherwise authorized by a court order, search warrant, and/or other applicable laws and regulations. The predetermined authorization policy 428 can further provide for different levels of access for different users 460 of the traffic event database 425. For example, a safety investigator may be granted access to all stored data with the exception of any personal identification information regarding individuals involved in the traffic event or witnesses to the traffic event; an owner of a vehicle may be granted unlimited access to stored data related to that vehicle only; etc.

Also disclosed herein are associated embodiments of a traffic event data source identification method, a traffic event data collection method and a traffic event data storage method.

Figure 5:
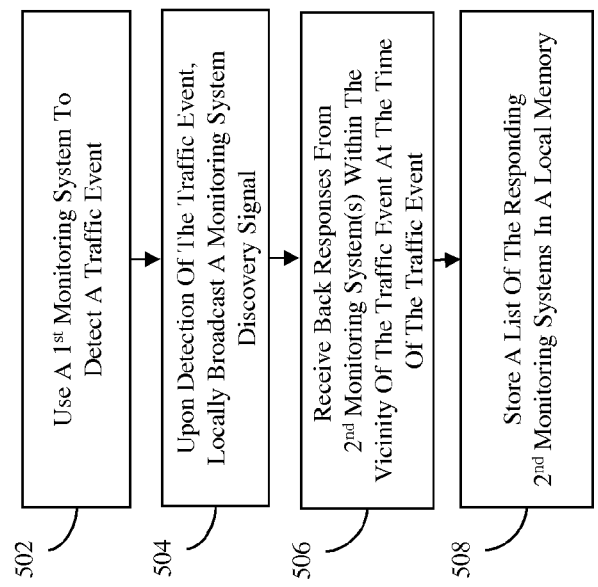
FIG. 5 is a flow diagram illustrating an embodiment of a traffic event data source identification method.

Specifically, referring to the flow diagram of FIG. 5 in combination with FIGS. 1 and 2, a traffic event data source identification method can comprise providing a traffic event data source identification system 200, as described in detail above and illustrated in FIG. 2.

The traffic event data source identification method can further comprise detecting (e.g., by the first monitoring system 110a) the occurrence of a traffic event 100 (502).

Next, in response to the traffic event 100, a monitoring system discovery signal 261 can be broadcast locally from the location of the traffic event 100 (e.g., by the inter-monitoring system communication device 230) (504). Specifically, as discussed in detail above with regard to the system embodiments, the inter-monitoring system communication device 230 (e.g., a radio frequency communication device, such as a radio frequency identification (RFID) device (e.g., an RFID transceiver), a near field communication (NFC) device, a Bluetooth®-enabled communication device, etc. or any other communication device capable of such local signal broadcasting) can broadcast the discovery signal 261 to any second monitoring systems, which are located within a predetermined distance 160 (e.g., 50 meters, 100 meters, etc.) of the traffic event 100 (e.g., to the monitoring systems 110b-f, but not monitoring system 110g) and which have the required inter-monitoring system communication devices to receive and respond to the monitoring system discover signal 261. The predetermined distance 160 within which the discovery signal is broadcast at process 504 can be established based on the broadcast range of the technology used as well as on a balancing of factors (e.g., the increase in possible data sources with an increase in range and the decrease in useful data from data sources at the outer limits of the broadcast range).

The traffic event data source identification method can further comprise receiving (e.g., by the inter-monitoring system communication device 230 in response to the discovery signal 261) response signals 262 from any second monitoring systems, which are located within the vicinity of the traffic event 100 or, more specifically, which were located within the vicinity of the traffic event 100 around the time the traffic event occurred and the discovery signal was broadcast (506). Each response signal 261 received at process 506 can include identification information for that respective second monitoring system. As discussed above, these second monitoring system(s) 110b-f can comprise, for example, on-board vehicle monitoring systems of vehicles involved in or in the vicinity of the traffic event at the time it occurred, traffic signal status monitoring systems on traffic signals within the vicinity of the traffic event, traffic enforcement monitoring systems within the vicinity of the traffic event, security surveillance monitoring systems within the vicinity of the traffic event, etc. Thus, for an on-board vehicle monitoring system (e.g., see on-board monitoring systems 110b and 110c of vehicles 101b and 101c, respectively), the identification information can comprise, for example, a vehicle identification information and/or vehicle owner identification information. For other types of monitoring systems (e.g., see traffic signal status monitoring system 110e, traffic enforcement monitoring system 110f and security surveillance monitoring system 110d), the identification information can comprise, for example, address information and/or owner identification information.

A list 225 of all second monitoring systems 110b-f responding to the monitoring system discovery signal 261, including the identification information, can be stored in a local memory 220 (508). The list 225 can be associated in the local memory 220 with a unique identifier for the traffic event 100. This unique identifier can comprise, for example, a date, time, and location (e.g., as indicated by global positioning system (GPS) coordinates) of the traffic event 100. To address privacy concerns, access to the local memory 220 can be limited, for example, to the owner of the first monitoring system 110a, unless otherwise authorized by a court order, search warrant, and/or other applicable laws and regulations.

Thus, the traffic event data source identification method provides for timely identification of traffic event data sources and, particularly, timely identification of other monitoring systems 110b-f, which were present in the vicinity of a traffic event 100 at the time it occurred and which may have recorded data regarding that traffic event 100. It should be noted that, when a second monitoring system that responds to the monitoring system discover signal is an on-board vehicle monitoring system (e.g., see monitoring system 110c of vehicle 101c), the identification information provided by this method may also lead to the identification of a witness to the traffic event that was not otherwise identified (e.g., the driver or passengers in the vehicle 101c).

Figure 6:
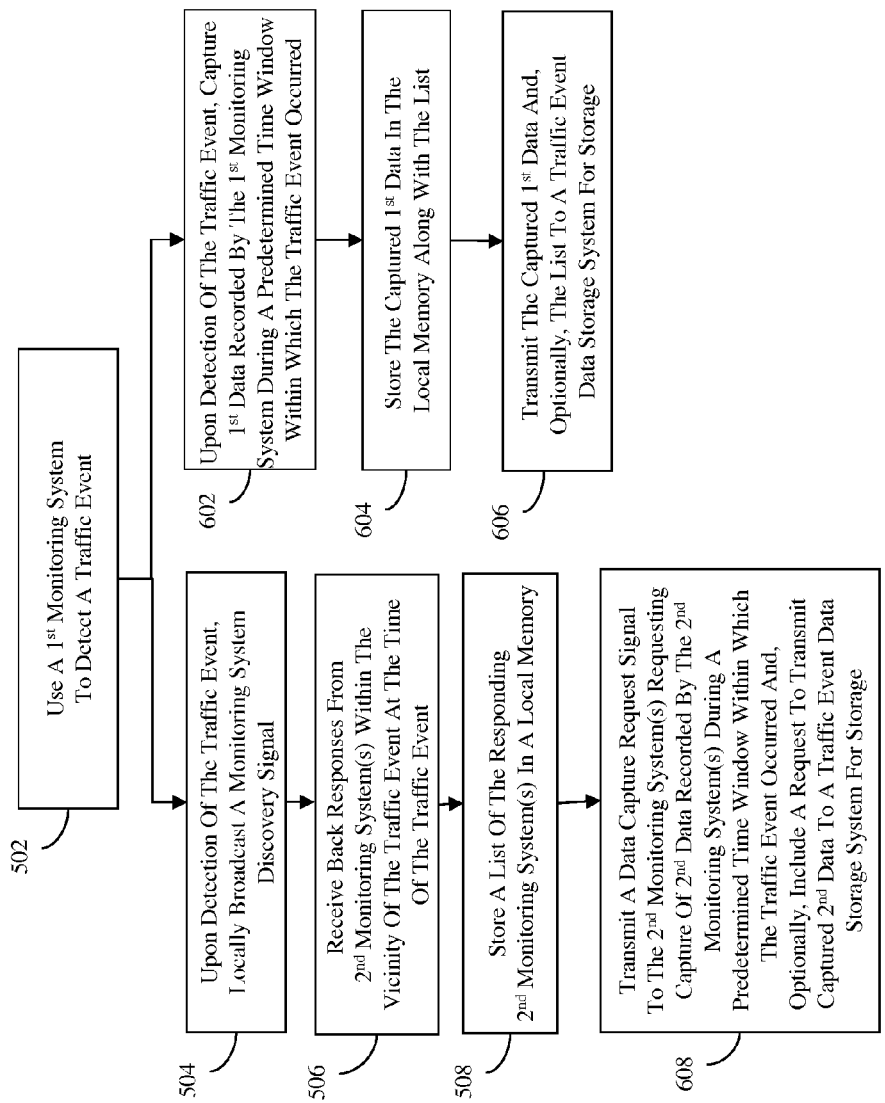
FIG. 6 is a flow diagram illustrating an embodiment of a traffic event data collection system incorporating the traffic event data source identification method of FIG. 5.

Referring to the flow diagram of FIG. 6 in combination with FIGS. 1 and 3, a traffic event data collection method can comprise providing a traffic event data collection system 300, as described in detail above and illustrated in FIG. 3. The traffic event data collection method can incorporate the traffic event data source identification method, as described in detail above, as well a number of additional process steps.

Specifically, in the traffic event data collection method, upon detection of the traffic event 100, the monitoring system discovery signal 261 can be locally broadcast at process 504 and, additionally, first data 321 recorded by the first monitoring system 110a around the time of the traffic event (e.g., within a predetermined time window during which the traffic event 100 occurred) can be captured (e.g., by an event data recorder) (602). For example, if, as illustrated, the first monitoring system 110a is an on-board vehicle monitoring system, an event data recorder can capture any recorded global positioning system (GPS) location information, any other recorded operational "black box" information, such as speed, crash severity, buckle status, brake application, steering inputs, video or photographic images, etc. The captured first data 321 can then be stored in the local memory 220 along with the list 225 of second monitoring system(s) and, particularly, stored such that it is associated with the same unique identifier as the list 225 and such that it is not overwritten or deleted (604). The captured first data 321 can also be transmitted (e.g., via a network interface device 330) to a traffic event data storage system for storage in a traffic event database (606). Optionally, the list 225 of second monitoring system(s) 110b-f can also be transmitted at process 606 to the traffic event data storage system for storage in the traffic event database along with the first data 321.

Additionally, the traffic event data collection method can comprise transmitting (e.g., by the inter-monitoring system communication device 230) a data capture request signal 263 to each second monitoring system 110b-f on the list 225, requesting that the second monitoring systems 110b-f capture any second data 322 they recorded within the same predetermined time window (608). Specifically, the data capture request signal 263 can request that any second data 322 recorded within the predetermined time window be associated with the same unique identifier for the traffic event 100 and stored locally such that it is not overwritten or deleted. As mentioned above, this unique identifier can comprise, for example, a date, time, and location (e.g., as indicated by global positioning system (GPS) coordinates) of the traffic event 100. It should be noted that, when the second monitoring system is another on-board vehicle monitoring system of another vehicle, the captured second data can be the recorded global positioning system (GPS) location information and other recorded operational "black box" information for that other vehicle. However, when the second monitoring system is a traffic signal status monitoring system, the second data can be traffic signal data; when the second monitoring system is a traffic enforcement monitoring system, the second data can be traffic camera data; when the second monitoring system is a security surveillance monitoring system, the second data can be video surveillance data; and so on. Optionally, the data capture request signal 263 transmitted by the inter-monitoring system communication device 230 at process 608 to the second monitoring systems 110b-f can further include a request that the second data 322 captured by the second monitoring systems be transmitted to the traffic event data storage system for storage in the traffic event database along with the first data 321.

Figure 7:
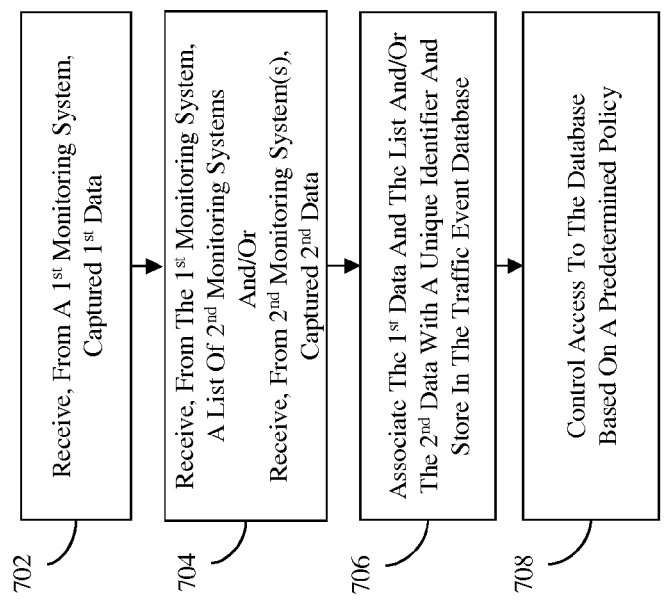
FIG. 7 is a flow diagram illustrating an embodiment of a traffic event data storage method.

Referring to the flow diagram of FIG. 7 in combination with FIGS. 1 and 4, a traffic event data storage method can comprise providing a traffic event data storage system 400, as described in detail above and illustrated in FIG. 4. The traffic event data storage method can comprise receiving and storing the data collected using the traffic event data collection method, as described in detail above.

Specifically, the traffic event data storage method can comprise receiving, via the network interface device 430, any first data 321, which was captured at process 602 by the first monitoring system 110a upon detection, by the first monitoring system 110a, of the traffic event 100 (702). The traffic event data storage method can further comprise receiving, via the network interface device 430, the list 225 of all second monitoring systems 110b-f that responded at process 506 to the monitoring system discovery signal 261 broadcast by the first monitoring system 110a and/or any second data 326 captured at process 608 by the second monitoring system(s) 110b-f in response to a data capture request signal 263 from the first monitoring system 110a (704).

The first data 321 as well as the list 225 and/or the second data 326 can be input (e.g., by the traffic event database server 450) into the traffic event database 425 such that they are associated with a unique identifier for the traffic event 100 (706). As discussed above, this unique identifier can comprise, for example, a date, time, and location (e.g., as indicated by global positioning system (GPS) coordinates) of the traffic event 100.

Additionally, to address privacy concerns, access to all data stored in the traffic event database 425 can be controlled (e.g., by the traffic event database server 450), based on a predetermined access authorization policy 428 (708). For example, the predetermined access authorization policy 428 can allow access by investigators or other users 460, as specified by the owners of the respective monitoring systems, unless otherwise authorized by a court order, search warrant, and/or other applicable laws and regulations. The predetermined authorization policy 428 can further provide for different levels of access for different users 460 of the traffic event database 425. For example, a safety investigator may be granted access to all stored data with the exception of any personal identification information regarding individuals involved in the traffic event or witnesses to the traffic event; an owner of a vehicle may be granted unlimited access to stored data related to that vehicle only; etc.

Also disclosed herein are embodiments of a program storage device (i.e., a computer program product) readable by a computer and tangibly embodying a program of instructions executable by the computer to perform any one or more of the above-described process steps. Specifically, as will be appreciated by one skilled in the art, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in one or more computer readable medium(s) having computer readable program code embodied thereon.

Any combination of one or more computer readable medium(s) may be utilized. The computer readable medium may be a non-transitory computer readable storage device or a computer readable signal medium. A non-transitory computer readable storage device may be, for example, but not limited to, an electronic, magnetic, optical, electromagnetic, infrared, or semiconductor system, apparatus, or device, or any suitable combination of the foregoing. More specific examples (a non-exhaustive database) of the non-transitory computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electro-magnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
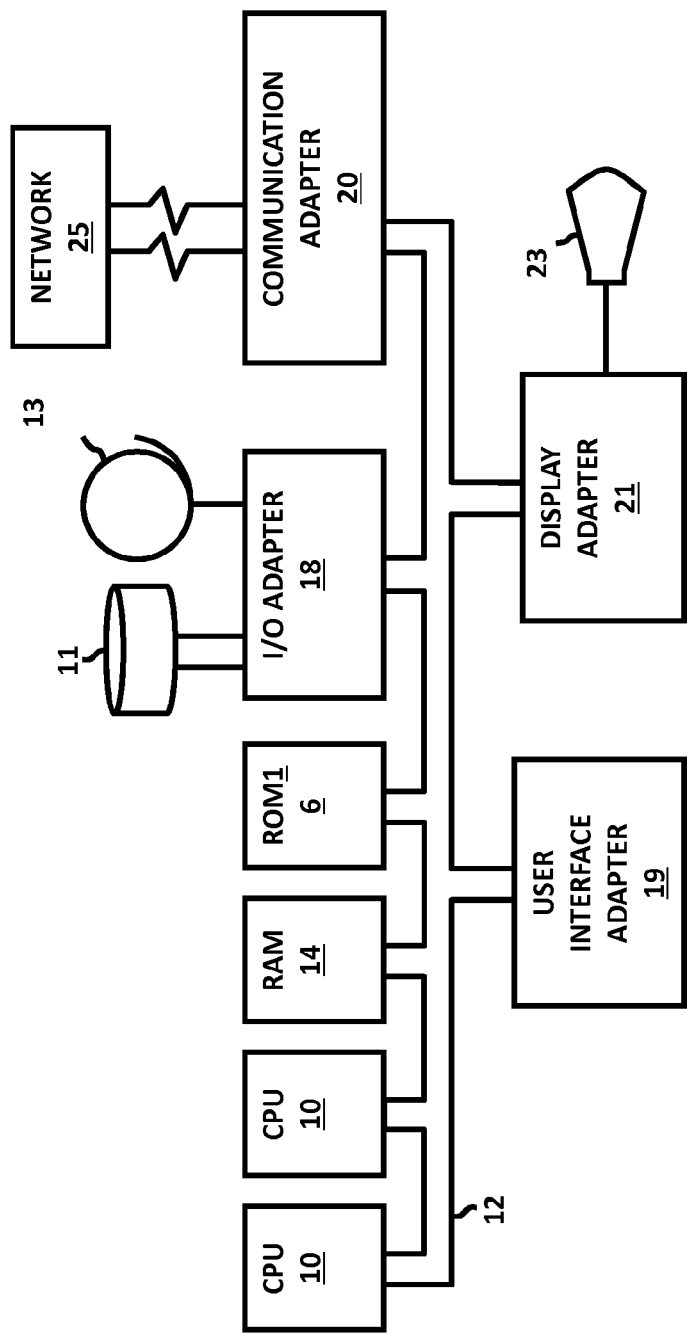
FIG. 8 is a schematic diagram illustrating a representative hardware environment for implementing the embodiments disclosed herein.

A representative hardware environment is depicted in FIG. 8 for implementing any of the system, method and program storage device (i.e., computer program product) embodiments, as discussed in detail above. This schematic drawing illustrates a hardware configuration of an information handling/computer system in accordance with the disclosed embodiments. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the disclosed embodiments. The system further includes a user interface adapter 19 that connects user interface devices (not shown) to the bus 12 to gather user input. Additionally, a communication adapter 20 connects the bus 12 to a communication network 25, and a display adapter 21 connects the bus 12 to a display device 23.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing particular embodiments only and is not intended to be limiting. As used herein, the singular forms "a", "an" and "the" are intended to include the plural forms as well, unless the context clearly indicates otherwise. It should further be understood that the terms "comprises", "comprising", "included", and/or "including", when used in this specification, specify the presence of stated features, integers, steps, operations, elements, and/or components, but do not preclude the presence or addition of one or more other features, integers, steps, operations, elements, components, and/or groups thereof. It should further be understood that corresponding structures, materials, acts, and equivalents of all means or step plus function elements in the claims below are intended to include any structure, material, or act for performing the function in combination with other claimed elements as specifically claimed. Finally, it should be understood that the above-description of the embodiments was presented for purposes of illustration and was not intended to be exhaustive or limiting. Many modifications and variations will be apparent to those of ordinary skill in the art without departing from the scope and spirit of the disclosed embodiments.

Therefore, disclosed above are embodiments of systems and associated methods for traffic event data source identification, traffic event data collection and traffic event data storage. The traffic event data source identification embodiments can comprise a first monitoring system that detects a traffic event, an inter-monitoring system communication device that broadcasts a monitoring system discover signal and receives back response signals from any second monitoring systems within the vicinity of the traffic event, and a memory that stores a list of responding second monitoring systems. The traffic event data collection embodiments can incorporate the identification system and a network interface device. In this case, the first monitoring system can capture data recorded at the time of the traffic event and the network interface device can transmit this data and, optionally, the list to a traffic event data storage system for storage in a traffic event database. The inter-monitoring system communication device can also transmit a data capture request signal to the second monitoring system(s) requesting capture of any data recorded at the time of the traffic event and, optionally, requesting that such data be transmitted to the data storage system. To address privacy concerns, access to the traffic event database can be controlled based on a predetermined access authorization policy. Thus, these embodiments provide for automatically identifying data sources with data about a traffic event, for collecting the data from those data sources in a timely manner, and for securely storing the collected data in a central location.

What is claimed is:

1. A traffic event data source identification system comprising:
   a first monitoring system onboard a vehicle;
   an inter-monitoring system communication device onboard said vehicle and comprising a radio frequency communication device having a limited broadcast range and comprising any of a radio frequency identification (RFID) device, a near field communication (NFC) device, and a Bluetooth®-enabled communication device;
   a memory onboard said vehicle; and,
   a system bus onboard said vehicle and electrically connecting said first monitoring system, said inter-monitoring system communication device and said memory,
   said first monitoring system detecting a traffic event involving said vehicle,
   said inter-monitoring system communication device automatically broadcasting a monitoring system discovery signal in response to said traffic event such that said monitoring system discovery signal is automatically broadcast from a location of said traffic event immediately following said traffic event,
   said monitoring system discovery signal being received by at least one second inter-monitoring system communication device that is connected to at least one second monitoring system and that is located within said limited broadcast range and thereby within a predetermined distance of said location of said traffic event at approximately a time of said traffic event such that said at least one second monitoring system is a potential data source for data about said traffic event,
   said at least one second monitoring system being either on a stationary structure or on-board and electrically connected to an additional system bus of an additional vehicle,
   said inter-monitoring system communication device further receiving at least one response signal from said at least one second monitoring system through said at least one second inter-monitoring system communication device,
   said response signal communicating identification information for said at least one second monitoring system and being generated by said at least one second monitoring system automatically and in response to said monitoring system discovery signal, and
   said memory storing a list of all second monitoring systems responding to said monitoring system discovery signal, said list being associated in said memory with a unique identifier for said traffic event and listing all identification information communicated to said inter-monitoring system communication device from said all second monitoring systems responding to said monitoring system discovery signal.

2. The traffic event data source identification system of claim 1, said first monitoring system comprising at least one of the following:
   an airbag deployment sensor sensing deployment of an airbag on said vehicle and indicating occurrence of said traffic event involving said vehicle; and,
   a brake pedal sensor sensing that an amount of force applied to a brake pedal on said vehicle is above a predetermined threshold and indicating said occurrence of said traffic event involving said vehicle.

3. The traffic event data source identification system of claim 1, wherein said at least one second inter-monitoring system communication device and said at least one second monitoring system are located on said stationary structure, said at least one second monitoring system comprises any of a traffic signal status monitoring system, a traffic enforcement monitoring system and a security surveillance monitoring system.

4. The traffic event data source identification system of claim 1, said list being anyone of the following:
   downloadable to an external device physically connected to an input/output port onboard said vehicle; and, uploadable to another system for storage and analysis via a wireless network interface device onboard said vehicle.

5. The traffic event data source identification system of claim 1,
wherein, when said at least one second monitoring system is on said stationary structure, said identification information comprises structure address information and structure owner information, and
wherein, when said at least one second monitoring system is onboard said additional vehicle, said identification information comprises vehicle identification information and vehicle owner information.

6. The traffic event data source identification system of claim 1, said unique identifier for said traffic event comprising a date of said traffic event, said time of said traffic even and said location of said traffic event,
wherein an event data recorder and a global positioning system are onboard said vehicle and electrically connected to said system bus,
wherein said global positioning system acquires location information for said vehicle, said location information being indicated by global positioning system coordinates, and
wherein, in response to said traffic event, said event data recorder automatically captures said date, said time and said location information for said unique identifier.

7. A traffic event data collection system comprising:
a first monitoring system onboard a vehicle;
an inter-monitoring system communication device onboard said vehicle and comprising a radio frequency communication device having a limited broadcast range and comprising any of a radio frequency identification (RFID) device, a near field communication (NFC) device, and a Bluetooth®-enabled communication device;
a memory onboard said vehicle;
a network interface device onboard said vehicle; and,
a system bus onboard said vehicle and electrically connecting said first monitoring system, said inter-monitoring system communication device, said memory and said network interface device,
said first monitoring system detecting a traffic event involving said vehicle and, in response to said traffic event, capturing first data recorded by said first monitoring system within a predetermined time window during which said traffic event occurred,
said inter-monitoring system communication device automatically broadcasting a monitoring system discovery signal in response to said traffic event such that said monitoring system discovery signal is automatically broadcast from a location of said traffic event immediately following said traffic event,
said monitoring system discovery signal being received by at least one second inter-monitoring system communication device that is connected to at least one second monitoring system and that is located within said limited broadcast range and thereby within a predetermined distance of said location of said traffic event at approximately a time of said traffic event such that said at least one second monitoring system is a potential data source for data about said traffic event,
said at least one second monitoring system being either on a stationary structure or on-board and electrically connected to an additional system bus of an additional vehicle,
said inter-monitoring system communication device further receiving at least one response signal from said at least one second monitoring system through said at least one second inter-monitoring system communication device,
said response signal communicating identification information for said at least one second monitoring system and being generated by said at least one second monitoring system automatically and in response to said monitoring system discovery signal,
said memory storing said first data and a list of all second monitoring systems responding to said monitoring system discovery signal, said list being associated in said memory with a unique identifier for said traffic event and listing all identification information communicated to said inter-monitoring system communication device from said all second monitoring systems responding to said monitoring system discovery signal,
said inter-monitoring system communication device further automatically sending a data capture request signal to said at least one second monitoring system following receipt of said response signal, said data capture request signal requesting that said at least one second monitoring system capture second data recorded by said at least one second monitoring system within said predetermined time window and store said second data locally such that said second data is associated with said unique identifier and such that said second data can not be overwritten or deleted, and
said network interface device transmitting said first data and said list to a traffic event data storage system for storage.

8. The traffic event data collection system of claim 7, said first monitoring system comprising at least one of the following:
an airbag deployment sensor sensing deployment of an airbag on said vehicle and indicating occurrence of said traffic event involving said vehicle; and,
a brake pedal sensor sensing that an amount of force applied to a brake pedal on said vehicle is above a predetermined threshold and indicating said occurrence of said traffic event involving said vehicle.

9. The traffic event data collection system of claim 7, wherein said at least one second inter-monitoring system communication device and said at least one second monitoring system are located on said stationary structure, said at least one second monitoring system comprises any of a traffic signal status monitoring system, a traffic enforcement monitoring system and a security surveillance monitoring system.

10. The traffic event data collection system of claim 7, said first monitoring system and said at least one second monitoring system each having on-off switches operable by a user to allow-disallow communication with other monitoring systems and said traffic event data storage system.

11. The traffic event data collection system of claim 7, said data capture request signal further requesting that said second monitoring system transmit said second data to said traffic event data storage system for storage.

12. The traffic event data collection system of claim 7,
wherein, when said at least one second monitoring system is on said stationary structure, said identification information comprises structure address information and structure owner information, and
wherein, when said at least one second monitoring system is onboard said additional vehicle, said identification information comprises vehicle identification information and vehicle owner information.

13. The traffic event data collection system of claim 7, said unique identifier for said traffic event comprising a date of said traffic event, said time of said traffic even and said location of said traffic event,
- wherein an event data recorder and a global positioning system are onboard said vehicle and electrically connected to said system bus,
- wherein said global positioning system acquires location information for said vehicle, said location information being indicated by global positioning system coordinates, and
- wherein, in response to said traffic event, said event data recorder automatically captures said date, said time and said location information for said unique identifier.

14. A traffic event data source identification method comprising:
- detecting, by a first monitoring system of a traffic event data source identification system, a traffic event, said first monitoring system being onboard a vehicle and said traffic event involving said vehicle;
- broadcasting, by an inter-monitoring system communication device of said traffic event data source identification system, a monitoring system discovery signal,
  - said inter-monitoring system communication device being onboard said vehicle and automatically broadcasting said monitoring system discovery signal in response to said traffic event such that said monitoring system discovery signal is automatically broadcast from a location of said traffic event immediately following said traffic event,
  - said inter-monitoring system communication device comprising a radio frequency communication device having a limited broadcast range and comprising any of a radio frequency identification (RFID) device, a near field communication (NFC) device, and a Bluetooth®-enabled communication device,
- said monitoring system discovery signal being received by at least one second inter-monitoring system communication device that is connected to at least one second monitoring system and that is located within said limited broadcast range and thereby within a predetermined distance of said locations of said traffic event at approximately a time of said traffic event such that said at least one second monitoring system is a potential data source for data about said traffic event, and
- said at least one second monitoring system being either on a stationary structure or on-board and electrically connected to an additional system bus of an additional vehicle;
- receiving, by said inter-monitoring system communication device, at least one response signal from said at least one second monitoring system through said at least one second inter-monitoring system communication device, said response signal communicating identification information for said at least one second monitoring system and being generated by said at least one second monitoring system automatically and in response to said monitoring system discovery signal; and
- storing, in a memory of said traffic event data source identification system, a list of all second monitoring systems responding to said monitoring system discovery signal, said list being associated in said memory with a unique identifier for said traffic event and listing all identification information communicated to said inter-monitoring system communication device from said all second monitoring systems responding to said monitoring system discovery signal,
- said memory being onboard said vehicle, and
- said first monitoring system, said inter-monitoring system communication device and said memory being electrically connected by a system bus onboard said vehicle.

15. The traffic event data source identification method of claim 14, said detecting being performed by at least one of the following:
- an airbag deployment sensor of said first monitoring system sensing deployment of an airbag on said vehicle and indicating occurrence of said traffic event involving said vehicle; and,
- a brake pedal sensor of said first monitoring system sensing that an amount of force applied to a brake pedal on said vehicle is above a predetermined threshold and indicating said occurrence of said traffic event involving said vehicle.

16. The traffic event data source identification method of claim 14, wherein said at least one second inter-monitoring system communication device and said at least one second monitoring system are located on said stationary structure, said at least one second monitoring system comprises any of a traffic signal status monitoring system, a traffic enforcement monitoring system and a security surveillance monitoring system.

17. The traffic event data source identification method of claim 14, said list being anyone of the following:
- downloadable to an external device physically connected to an input/output port onboard said vehicle; and
- uploadable to another system for storage and analysis via a wireless network interface device onboard said vehicle.

18. The traffic event data source identification method of claim 14,
- wherein, when said at least one second monitoring system is on said stationary structure, said identification information comprises structure address information and structure owner information, and
- wherein, when said at least one second monitoring system is onboard said additional vehicle, said identification information comprises vehicle identification information and vehicle owner information.

19. The traffic event data source identification method of claim 14, said unique identifier for said traffic event comprising a date of said traffic event, said time of said traffic even and said location of said traffic event,
- wherein an event data recorder and a global positioning system are onboard said vehicle and electrically connected to said system bus,
- wherein said global positioning system acquires location information for said vehicle, said location information being indicated by global positioning system coordinates, and
- wherein, in response to said traffic event, said event data recorder automatically captures said date, said time and said location information for said unique identifier.

20. A traffic event data collection method comprising:
- detecting, by a first monitoring system of a traffic event data collection system, a traffic event, said first monitoring system being onboard a vehicle and said traffic event involving said vehicle;
- capturing, by said first monitoring system, in response to said traffic event, any first data recorded by said first monitoring system within a predetermined time window during which said traffic event occurred;

automatically broadcasting, by an inter-monitoring system communication device of said traffic event data collection system, a monitoring system discovery signal, said inter-monitoring system communication device being onboard said vehicle and broadcasting said monitoring system discovery signal in response to said traffic event such that said monitoring system discovery signal is automatically broadcast from a location of said traffic event immediately following said traffic event, said inter-monitoring system communication device comprising a radio frequency communication device having a limited broadcast range and comprising any of a radio frequency identification (RFID) device, a near field communication (NFC) device, and a Bluetooth®-enabled communication device, said monitoring system discovery signal being received by at least one second inter-monitoring system communication device that is connected to at least one second monitoring system and that is located within said limited broadcast range and thereby within a predetermined distance of said location of said traffic event at approximately a time of said traffic event such that said at least one second monitoring system is a potential data source for data about said traffic event, and said at least one second monitoring system being either on a stationary structure or on-board and electrically connected to an additional system bus of an additional vehicle;

receiving, by said inter-monitoring system communication device, at least one response signal from said at least one second monitoring system through said at least one second inter-monitoring system communication device, said response signal communicating identification information for said at least one second monitoring system and being generated by said at least one second monitoring system automatically and in response to said monitoring system discovery signal;

storing, in a memory of said traffic event data collection system, said first data and a list of all second monitoring systems responding to said monitoring system discovery signal, said memory being onboard said vehicle, said list being associated in said memory with a unique identifier for said traffic event and listing all identification information communicated to said inter-monitoring system communication device from said all second monitoring systems responding to said monitoring system discovery signal;

automatically sending, by said inter-monitoring system communication device to said at least one second monitoring system following receipt of said response signal, a data capture request signal requesting that said at least one second monitoring system capture second data recorded by said at least one second monitoring system within said predetermined time window and store said second data locally such that said second data is associated with said unique identifier and such that said second data can not be overwritten or deleted; and, transmitting, via a network interface device of said traffic event data collection system, said first data and said list to a traffic event data storage system for storage, said network interface device being onboard said vehicle, and said first monitoring system, said inter-monitoring system communication device, said network interface device, and said memory being electrically connected by a system bus onboard said vehicle.

21. The traffic event data collection method of claim 20, said detecting being performed by at least one of the following:

an airbag deployment sensor of said first monitoring system sensing deployment of an airbag on said vehicle and indicating occurrence of said traffic event involving said vehicle; and, a brake pedal sensor of said first monitoring system sensing that an amount of force applied to a brake pedal on said vehicle is above a predetermined threshold and indicating said occurrence of said traffic event involving said vehicle, and said at least one second monitoring system comprising any of an on-board vehicle monitoring system onboard at least one additional vehicle, a traffic signal status monitoring system, a traffic enforcement monitoring system and a security surveillance monitoring system.

22. The traffic event data collection method of claim 20, said capture request further requesting that said second monitoring system transmit said second data to a traffic event database server for storage in a traffic event database.

23. The traffic event data collection method of claim 20, wherein, when said at least one second monitoring system is on said stationary structure, said identification information comprises structure address information and structure owner information, and wherein, when said at least one second monitoring system is onboard said additional vehicle, said identification information comprises vehicle identification information and vehicle owner information.

24. The traffic event data collection method of claim 20, said unique identifier for said traffic event comprising a date of said traffic event, said time of said traffic even and said location of said traffic event, wherein an event data recorder and a global positioning system are onboard said vehicle and electrically connected to said system bus, wherein said global positioning system acquires location information for said vehicle, said location information being indicated by global positioning system coordinates, and wherein, in response to said traffic event, said event data recorder automatically captures said date, said time and said location information for said unique identifier.

\* \* \* \* \*

UNITED STATES PATENT AND TRADEMARK OFFICE
CERTIFICATE OF CORRECTION

PATENT NO. : 9,852,636 B2  
APPLICATION NO. : 13/474818  
DATED : December 26, 2017  
INVENTOR(S) : Stephen Y. Chow et al.

Page 1 of 1

It is certified that error appears in the above-identified patent and that said Letters Patent is hereby corrected as shown below:

On the Title Page

(73) Assignee should read: International Business Machines Corporation, Armonk, NY (US)

Signed and Sealed this
Twenty-eighth Day of August, 2018

Andrei Iancu
*Director of the United States Patent and Trademark Office*